Aug. 28, 1928.
A. A. MERRILL
1,682,138
AIRPLANE LABORATORY
Filed March 25, 1925
3 Sheets-Sheet 1
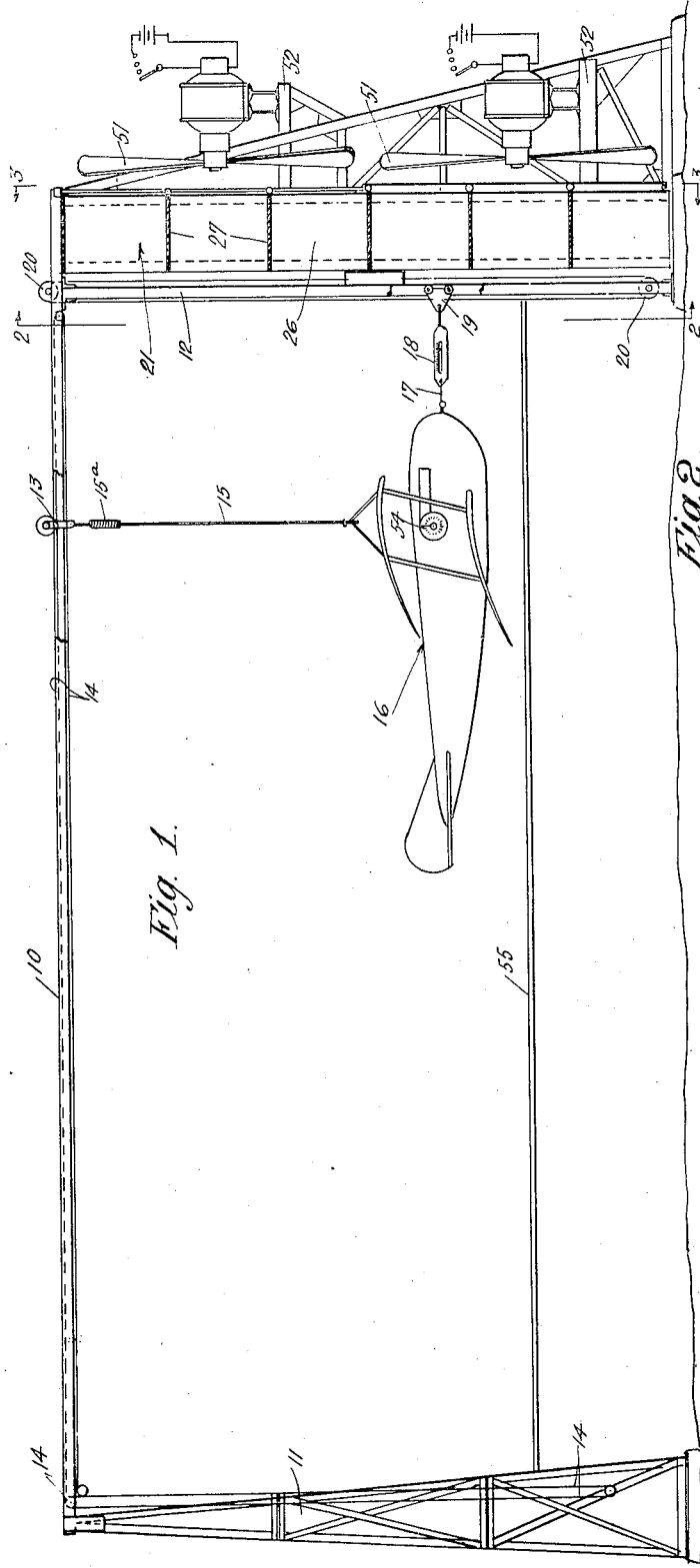
Fig. 1.
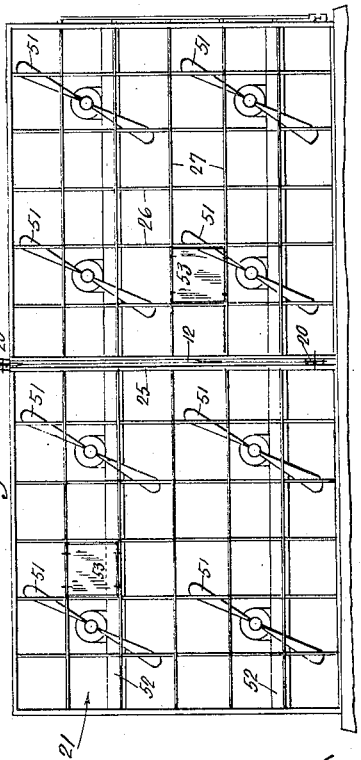
Fig. 2.
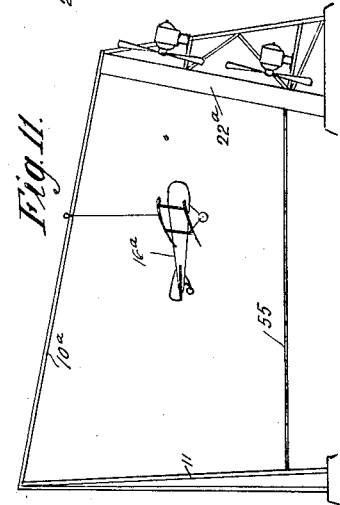
Fig. 11.
Inventor.
Albert A. Merrill.
Attorney.

Aug. 28, 1928.
A. A. MERRILL
1,682,138
AIRPLANE LABORATORY
Filed March 25, 1925    3 Sheets-Sheet 2
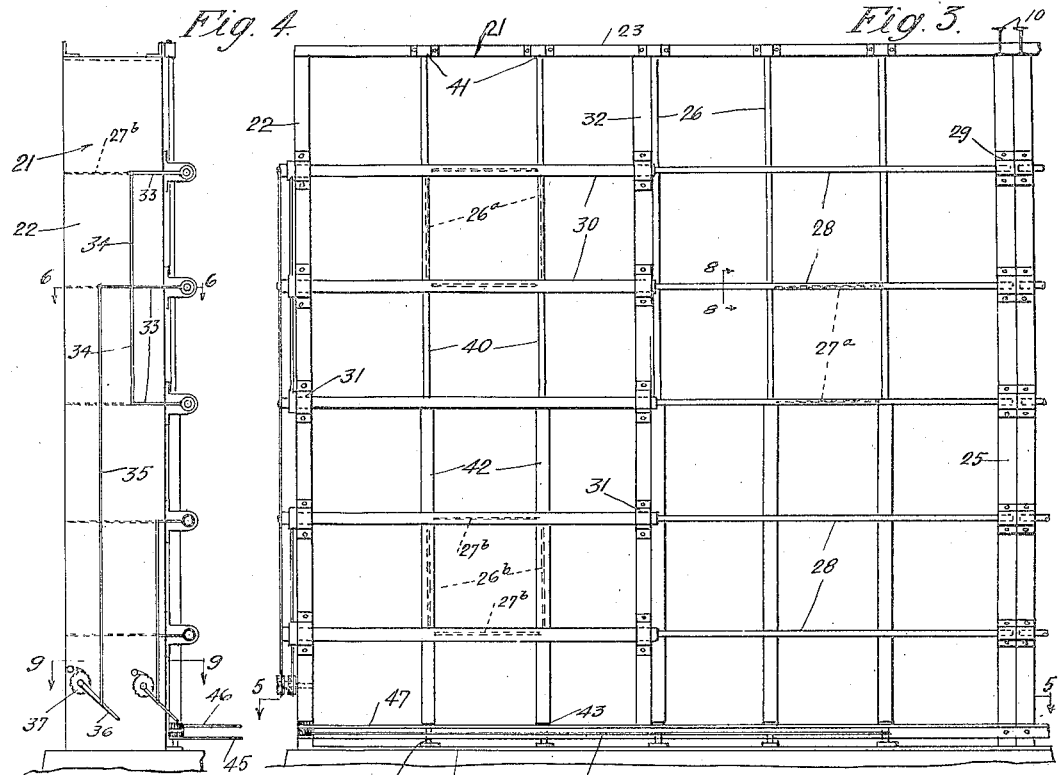
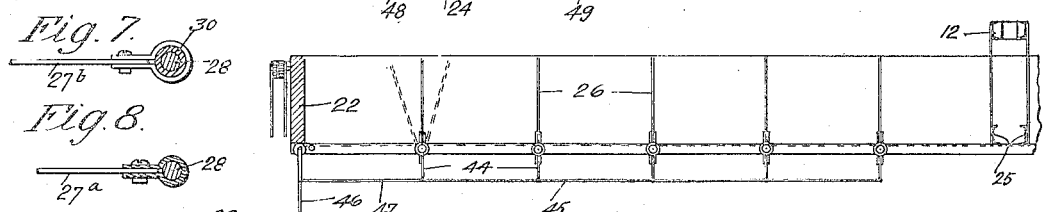
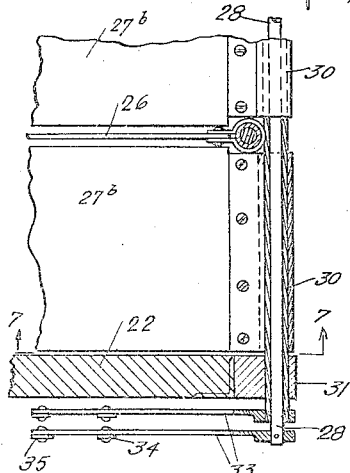
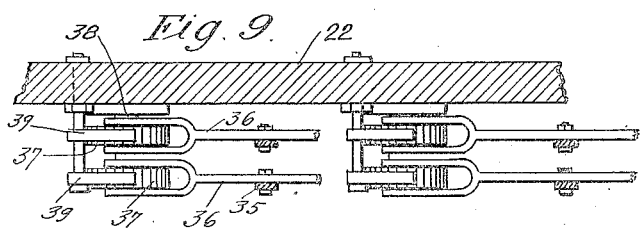
Inventor
Albert A. Merrill.
Attorney

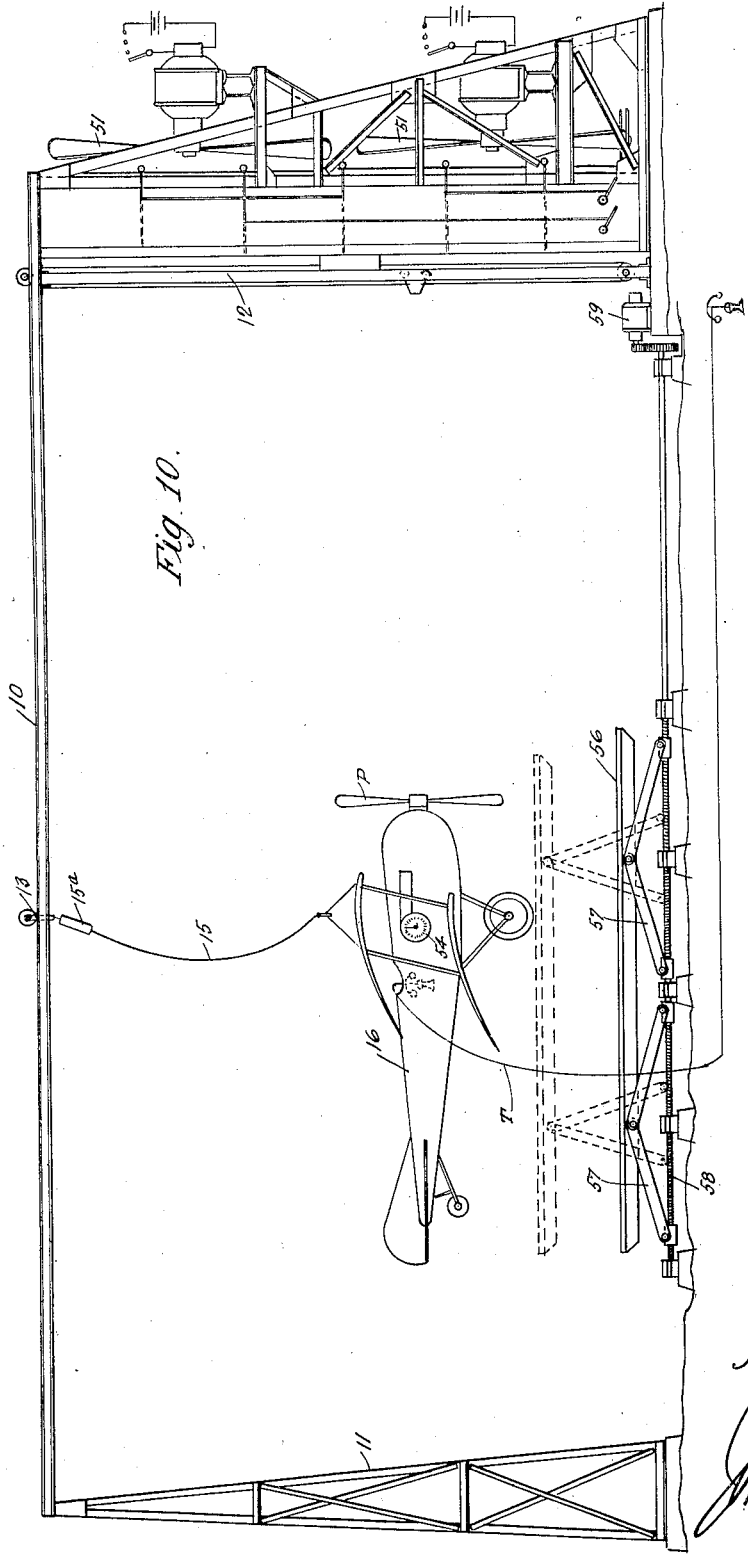

Patented Aug. 28, 1928.

1,682,138

UNITED STATES PATENT OFFICE.

ALBERT A. MERRILL, OF PASADENA, CALIFORNIA.

AIRPLANE LABORATORY.

Application filed March 25, 1925. Serial No. 18,254.

This invention relates to apparatus adapted for use in connection with various phases of research work in the airplane field, the testing of airplanes prior to being put in service, the training of pilots and recreational pursuits.

The apparatus embodying my invention may be generally described as an overhead supporting structure from which a full size airplane may be suspended, means for creating an air blast, and means for directing the air blast against the wings of the suspended airplane so as to simulate actual flying conditions without the attendant danger.

First consider the adaptability of the apparatus to research work. Heretofore practically all research work has been carried on by the use of miniature models suspended in wind tunnels. One of the chief faults of the wind tunnel system resides in the fact that it is impracticable, if not impossible, to reproduce in miniature all structural features of a full size airplane. For instance, the wire bracing system, with its particular degree of resistance, is practically impossible of reproduction in accurate proportion. Nor can the true proportion of parasite resistance and conditions of "mutual interference" be present. With these and other important factors undetermined in a truly accurate sense, it is impossible to predetermine the stability and performance of the actual plane built, as nearly as possible, after the miniature. On the other hand, the actual plane is used in connection with my apparatus, giving visual evidence of the performance to be expected of it when subjected to actual flying conditions. Then it is rendered easy, by the use of suitable instruments and attachments, to secure a record of performance under known and recorded conditions, from which various desirable computations may be made. The relative efficiency of various motors and propellers can also be determined with exact nicety.

The apparatus is such that the actions of the pilot and effects thereof may be observed and taken into account when arriving at conclusions. The value of this feature is self-apparent.

The airplane may be overstrained to the point of failure, but when it fails there is no attendant danger to life. From the failure-tests can be determined safe loads for planes of the tested type.

There previously having been no way to test a newly made airplane in flight except by a pilot actually taking the machine into the air, the testing activities of the airplane industry have been fraught with danger. That this danger is entirely done away with by use of my apparatus is self-evident.

As a means for training pilots, the apparatus is most useful. In perfect safety a novice may fly the captive plane, and due to the knowledge of this safety and the consequent lessening of nervous strain, the student can be taught to fly in minimum time and at minimum expense. By imposing upon the plane conditions which call for rectification of the control system, the quickness of the operator's response may be noted, and should his reaction be slower than permissible to flood flying, further training must be given the operator; his failure, in the first instance, having none of the disastrous results which would have attended a like failure if an actual flight were being made.

The apparatus is also useful in the amusement field, for pleasure seekers are thereby enabled to enjoy the thrills of flight and piloting without exposing themselves to danger.

Other novel features and objects of the invention will be made apparent in the following detailed description, reference being made to the accompanying drawings, in which:

Fig. 1 is a side elevation of an apparatus embodying my invention and showing an airplane under test conditions within the apparatus, the air blast director being shown in section;

Fig. 2 is a view of the air blast director as viewed from the position of line 2—2 of Fig. 1;

Fig. 3 is an enlarged, fragmentary view of the air blast director as viewed from the opposite side;

Fig. 4 is an end elevation of Fig. 3;

Fig. 5 is a section on line 5—5 of Fig. 3;

Fig. 6 is an enlarged, fragmentary section on line 6—6 of Fig. 4;

Fig. 7 is a section on line 7—7 of Fig. 6;

Fig. 8 is a fragmentary section on line 8—8 of Fig. 3;

Fig. 9 is an enlarged fragmentary section on line 9—9 of Fig. 4;

Fig. 10 is a view similar to Fig. 1 but showing a take-off and landing platform as a part of the apparatus and showing a propeller on the airplane in place of the drag line connection between plane and supporting structure, as in Fig. 1; and Fig. 11 is a view showing a modified type of apparatus especially adapted for use in soaring exercises.

While, in the following specification, I will describe structural features in some detail, it will be understood this is done merely to explain clearly a typical physical embodiment of the invention and is not to be considered as limitative.

I will first describe the structure whereby the plane to be tested or studied is suspended between periods of simulated flight. An overhead rail 10 is supported at one end by tower 11 while the other end is carried on top upright rail 12. A carriage 13 is adapted to roll along rail 10, there preferably being a cable and pulley system 14, adapted to be operated from the ground, whereby the carriage may be shifted along the rail. From carriage 13 depends a suspension cable 15 adapted for attachment to the airplane to be tested.

In Fig. 1 bi-plane 16 is shown to be propeller-less, the nose of the plane being connected by cable 17 to spring balance 18 which, in turn, is secured to carriage 19. Carriage 19 is adapted to roll up or down rail 12 and may be positively rolled or controlled by means of cable and pulley system 20.

At the other side of rail 12 is provided an air blast directing member 21, which may be generally described as a honeycomb structure, wherein the ends of the cells are open to provide through passages for the air blast, and in which the cell defining walls are movable so air currents passed therethrough may be varied in direction.

I have shown the honeycomb structure within a supporting frame made up of ends 22, top rail 23, base 24 and a central upright or partition 25, of which rail 12 may be a part. A typical cell is defined by side walls 26 and top and bottom walls 27; the top and bottom walls being pivotally mounted at one end so they may be swung angularly through a vertical plane, and the side walls being pivotally mounted so they may be swung through horizontal planes. Now it is not necessary to the invention, considered in its broader aspects, to so mount the walls or vanes, nor is any particular method of controlling the vane movement essential to the invention. For the purpose of illustration, I have shown structure 21 divided into units of several cells each, with means for moving the vanes of each unit simultaneously. However, it lies within the scope of the invention to provide means for moving each vane independently. When employing the unit system of control it is preferable that upright 12 be at a dividing line between units so the delivered air blast may be divided at the nose of the tested airplane.

In Fig. 3 I have shown a typical example of unit control. The horizontal vanes 27$^a$ are mounted on rock shafts 28 which are journaled at one end 29 on upright 25, while the other ends of the shafts extend through and beyond sleeves 30 on which are mounted horizontal vanes 27$^b$. Sleeves 30 are journaled at 31 on uprights 22 and 32. On shafts 28 are crank arms 33, interconnected by links 34, and one of the arms is attached to control rod 35 which extends downwardly into connection with operating handle 36, the latter being connected to a toothed wheel 37 journaled on stationary stud 38. It is evident how radial movement of handle 36 imparts like movement to vanes 27$^a$. There may be a locking pawl 39 adapted to hold wheel 37 and hence handle 36 and vanes 27$^a$ in adjusted position.

A similar control system is connected to sleeves 30 whereby they may be rocked to adjust vanes 27$^b$ independently of vanes 27$^a$.

Vertical vanes 26$^a$ are mounted on vertically extending shafts 40 which are supported in bearings 41 at the top and extend downwardly through hollow shafts 42, the latter being journaled on base 24 at 43 and carrying vanes 26$^b$. The ends of the sleeves carry cranks 44 which are interconnected by links 45, whereby the cranks may be moved to swing vanes 26$^b$ simultaneously by swinging operating handle 46, the latter being connected to the crank and link system by rod 47.

The lower ends of shafts 40 extend below sleeves 42 at 48, there being provided a crank and link system 49, similar to that described in connection with sleeves 42, and operable by handle 45, for swinging vanes 26$^a$ independently of vanes 26$^b$.

Mounted behind member 21 are the propellers 51, preferably independently driven and controllable, which are adapted to deliver air blasts through the cellular structure. The propellers may be provided in any desired number and arranged and supported in any suitable manner. I have illustrated them as being supported on framework 52.

Referring to Fig. 1, I will now describe one method of using the apparatus to advantage. With airplane 16 out of the field of action, propellers 51 are started up and independently adjusted as to speed, and the directing vanes are adjusted, until tests show that the air blast is uniform throughout, as measured through the vertical field in front of member 21. This may involve the partial or entire blocking off of certain cells, as, for instance, by plates 53 (Fig. 2).

Air plane 16 is then suspended by cable 15 and connected to balance 18 by cable 17. Propellers 51 are then sped up, and the airplane elevator and ailerons adjusted until the plane starts to lift, slackening cable 15; carriage 19 being rolled upwardly in order to maintain cable 17 as nearly horizontal as possible. A reading of balance 18 gives the drag of the airplane, which is equivalent in amount to the necessary thrust of the screw were the airplane moving through the air in place of the air moving past the captive plane, while a reading of anemometer 54 on the plane gives the air speed. A most convenient and useful record may be made by a series of photographs of the apparatus and plane as the plane or its controls are changed in position. For instance, there may be a datum line established by a cross bar 55 (or the datum line may be in the form of a cross hair in the camera used). Suppose a photograph were taken when the plane flies steadily. It will show the air speed, as indicated by anemometer 54; the drag, as indicated by balance 18; the angle of incidence, by reason of the photographed datum line; the elevator angle; and other useful information. With the weight of the machine known, it will be seen that comprehensive graphs may be drawn and various helpful computations made from which the "performance" may be figured. Heretofore, so far as I have been aware, it has been impossible to secure such information from full size machines with any considerable degree of accuracy, and similar information gained from small models does not always hold true for full size machines.

Where the machine is to be tested or the pilot trained in flying, the air speed may be varied or the director vanes shifted to simulate practically any condition which may be encountered in actual flying. This will be apparent from the foregoing and need not be further discussed.

In making certain tests and in training pilots, it is desirable that airplane propeller P be used for holding the plane in equilibrium, (Fig. 10), rather than drag line 17. In this way, knowing the air speed and noting the airplane propeller's angular velocity, it is possible to determine the relative efficiency of propellers having different characteristics. The photographic method of recordation may be used, the pilot communicating with the observer by means of telephone line T, and advising him of the motor's R. P. M. at the instant the picture is taken.

In training pilots, it is desirable that a vertically adjustable take-off and landing platform 56 be used. For instance, this platform may be mounted on collapsible V-frames 57, which are adapted to be spread or closed by means of a right and left lead-screw 58 operated by motor 59. By telephonic communication, the trainer, who controls the air speed and director vanes from the ground, and the pilot may be kept mutually advised as to engine and air speed, and act accordingly. For instance, suppose the plane to be in "flight" and it is desired to simulate a landing. The trainer gradually decreases the air speed, advising the pilot constantly of the instant air speed. The pilot manipulates his controls and decreases his engine speed accordingly, and if the plane settles properly the landing platform is raised to meet the plane, and the landing is made. On the other hand if it is evident to the trainer by observation that the airplane is not trimmed for a good landing the platform is kept away from the plane and any shock due to lack of control is taken by the shock absorber 15ᵃ interposed between the plane and the supporting member 10.

Of course it lies within the scope of my invention to substitute for the rigid beam 10 a steel cable properly anchored which will itself give a sufficient resiliency to care for all shocks. The pilot, of course, must endeavor to make a gentle landing without letting the plane move appreciably towards or away from director 21.

The various training exercises possible through use of the apparatus are many, for the plane may be exposed to practically any condition to be met in actual flying, as will be apparent to those skilled in the art.

In Fig. 11, suspension rail 10ᵃ is shown as inclining downwardly towards director 22ᵃ, the latter being disposed in a plane perpendicular to rail 10ᵃ, so the normal air blast may be directed parallel to the normal line of travel of glider 16ᵃ when it is allowed to gravitate. This type of apparatus is especially useful in the practice of soaring on an upward wind.

It is believed a full understanding of the invention will be had from the foregoing, but it will be understood the drawings and description are merely illustrative of and not restrictive on the broader claims appended hereto, for various changes in design, structure and arrangement may be made without departing from the spirit and scope of said claims.

I claim:

1. In apparatus of the character described, the combination of an elongated overhead support, a carriage movable over the support longitudinally, a cable suspended from the carriage and adapted for attachment to an airplane, means for delivering an air blast, and means adapted to direct the air blast beneath said support towards the airplane.

2. In apparatus of the character described, the combination of an overhead support, a cable suspended from the support and adapted for attachment to an airplane, means for delivering an air blast, and angularly adjustable vanes adapted to direct the air blast beneath said support towards the airplane.

3. In apparatus of the character described, the combination of an overhead support, a cable suspended from the support and adapted for attachment to an airplane, means adapted to direct an air blast beneath the support towards the airplane, an upright arranged forwardly of the suspension cable, a carriage substantially vertically movable along the upright, and a drag line anchored at one end to the carriage and adapted for attachment at its other end to the forward end of the airplane.

4. In apparatus of the character described, the combination of an overhead support, a cable suspended from the support and adapted for attachment to an airplane, means adapted to direct an air blast beneath the support towards the airplane, an upright arranged forwardly of the suspension cable, a carriage substantially vertically movable along the upright, a drag line anchored at one end to the carriage and adapted for attachment at its other end to the forward end of the airplane, and manually operated means adapted to move said carriage in the manner specified.

5. In apparatus of the character described, the combination of an overhead support, a cable suspended from the support and adapted for attachment to an airplane, means for delivering an air blast, and means adapted to direct the air blast beneath said support towards the airplane, said directing means embodying movably mounted vanes interposed between the suspension cable and air blast delivery means.

6. In apparatus of the character described, the combination of an overhead support, a cable suspended from the support and adapted for attachment to an airplane, means for delivering an air blast, and means adapted to direct the air blast beneath said support towards the airplane, said directing means embodying movably mounted vanes interposed between the suspension cable and air blast delivery means; and manually operated means adapted to move said vanes selectively.

7. In apparatus of the character described, the combination of an overhead support, a cable suspended from the support and adapted for attachment to an airplane, means for delivering an air blast, and means adapted to direct the air blast beneath said support towards the airplane, said means embodying a honey comb structure interposed between the suspension cable and air blast delivery means, the horizontal defining walls of the honeycomb cells being pivotally mounted on horizontal axes which are substantially at right angles to the axes of the cells.

8. In apparatus of the character described, the combination of an overhead support, a cable suspended from the support and adapted for attachment to an airplane, means for delivering an air blast, and means adapted to direct the air blast beneath said support towards the airplane, said means embodying a honey comb structure interposed between the suspension cable and air blast delivery means, the horizontal defining walls of the honeycomb cells being pivotally mounted on horizontal axes which are substantially at right angles to the axes of the cells; and means adapted to move said horizontal walls selectively about said horizontal axes.

9. In apparatus of the character described, the combination of an overhead support, a cable suspended from the support and adapted for attachment to an airplane, means for delivering an air blast, and means adapted to direct the air blast beneath said support towards the airplane, said means embodying a honeycomb structure interposed between the suspension cable and air blast delivery means, the vertical defining walls of the honeycomb structure being pivotally mounted on vertical axes.

10. In apparatus of the character described, the combination of an overhead support, a cable suspended from the support and adapted for attachment to an airplane, means for delivering an air blast, and means adapted to direct the air blast beneath said support towards the airplane, said means embodying a honeycomb structure interposed between the suspension cable and air blast delivery means, the vertical defining walls of the honeycomb structure being pivotally mounted on vertical axes, and means adapted to move said vertical walls about said vertical axes.

In witness that I claim the foregoing I have hereunto subscribed my name this 13th day of March, 1925.

ALBERT A. MERRILL.